(12) United States Patent
Gong et al.

(10) Patent No.: US 8,774,088 B2
(45) Date of Patent: Jul. 8, 2014

(54) LEGACY OPERATIONS IN A MU MIMO WIRELESS NETWORK

(75) Inventors: Michelle X Gong, Sunnyvale, CA (US);
Eldad Perahia, Portland, OR (US);
Adrian P Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 453 days.

(21) Appl. No.: 12/752,715

(22) Filed: Apr. 1, 2010

(65) Prior Publication Data

US 2011/0243073 A1 Oct. 6, 2011

(51) Int. Cl.
*H04W 4/00* (2009.01)

(52) U.S. Cl.
USPC ........... 370/328; 370/235; 370/329; 370/338; 370/466; 455/513; 455/522

(58) Field of Classification Search
None
See application file for complete search history.

(56) References Cited

U.S. PATENT DOCUMENTS

| | | | |
|---|---|---|---|
| 2001/0048672 A1* | 12/2001 | Okunishi et al. | 370/316 |
| 2005/0163058 A1* | 7/2005 | Nabetani et al. | 370/252 |
| 2007/0223422 A1* | 9/2007 | Kim et al. | 370/334 |
| 2007/0248045 A1* | 10/2007 | Nagaraj | 370/329 |
| 2008/0056205 A1 | 3/2008 | Nagai | |
| 2009/0257380 A1* | 10/2009 | Meier | 370/329 |
| 2011/0009143 A1* | 1/2011 | Kim et al. | 455/509 |
| 2011/0032897 A1 | 2/2011 | Ihm et al. | |

FOREIGN PATENT DOCUMENTS

| | | |
|---|---|---|
| KR | 10-2008-0065890 | 7/2008 |
| KR | 10-2009-0109042 A | 10/2009 |
| WO | 2009096714 | 8/2009 |
| WO | 2009123856 | 10/2009 |
| WO | 2010022264 | 2/2010 |
| WO | 2011/123422 A2 | 10/2011 |

OTHER PUBLICATIONS

International Preliminary Report on Patentability received for PCT Patent Application No. PCT/US2011/030282, mailed Oct. 11, 2012, 5 pgs.
Office Action received for Japanese Patent Application No. 2011-075474, mailed Sep. 4, 2012, 3 pgs. including 2 pgs. English translation.
International Search Report and Written Opinion received for PCT Patent Application No. PCT/US2011/030282, mailed on Nov. 30, 2011, 8 pages.
Office Action received for Chinese Patent Application No. 201110109164.4, mailed Jun. 3, 2013, 18 pages including 9 pages English translation.

* cited by examiner

*Primary Examiner* — Ian N Moore
*Assistant Examiner* — Eric H Wang
(74) *Attorney, Agent, or Firm* — Kacvinsky Daisak Bluni PLLC

(57) ABSTRACT

In a network that contains both new devices capable of using wide channels and legacy devices that can only use narrow channels, the network controller may define which devices are to use which narrow channels for concurrently transmitting uplink acknowledgements. Further, the network controller may schedule the devices to respond in groups based on the received signal strength of their transmissions at the network controller.

18 Claims, 7 Drawing Sheets

US 8,774,088 B2

LEGACY OPERATIONS IN A MU MIMO WIRELESS NETWORK

BACKGROUND

A wireless communications device following the industry standard IEEE 802.11n may communicate over a channel with a bandwidth of 40 MHz (comprised of two contiguous 20 MHz channels), while older legacy devices may only be able to communicate over the 20 MHz channels. To allow both types of devices to operate cooperatively in the same network, an 802.11n device may receive a downlink transmission over a wide 40 MHz channel, but transmit its uplink acknowledgement simultaneously over each of the narrow 20 MHz channels that make up that wide channel. Since the legacy devices are able to receive and decode this acknowledgement over at least one of the narrow channels, this allows them to know their narrow channels are busy so they won't transmit an interfering signal during that time. However, if the downlink transmission is directed towards multiple 802.11n devices, they must transmit their acknowledgements sequentially to avoid interfering with each other. These sequential transmissions unnecessarily take up time on those channels that could otherwise be used by other devices.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
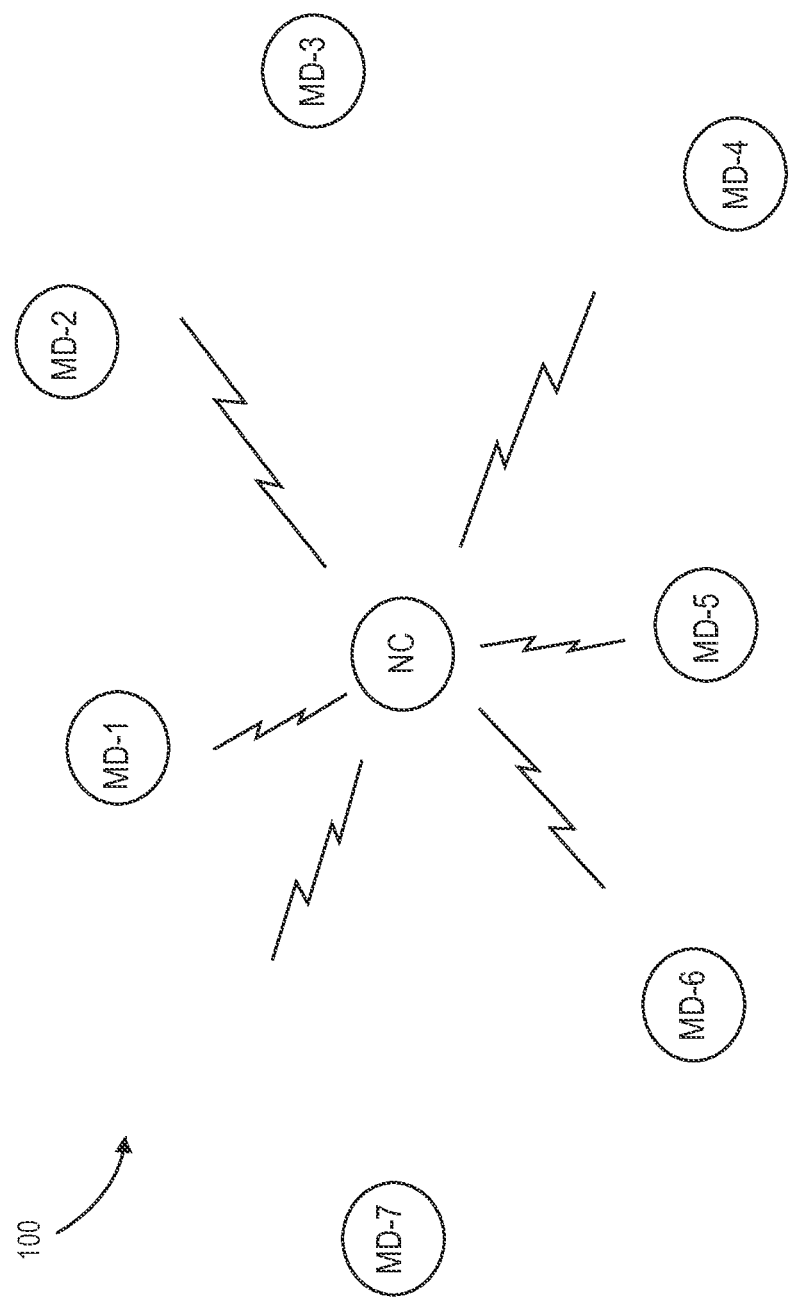
FIG. 1 shows a wireless communications network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. A wireless device may comprise at least one antenna, at least one radio, and at least one processor, where the radio's transmitter transmits signals through the antenna that represent data and the radio's receiver receives signals through the antenna that represent data, while the processor may process the data to be transmitted and the data that has been received. The processor may also process other data which is neither transmitted nor received.

As used within this document, the term "network controller" (NC) is intended to cover devices that schedule and control, at least partially, wireless communications by other devices in the network. An NC may also be known as a base station (BS), access point (AP), central point (CP), or any other term that may arise to describe the functionality of a network controller.

As used within this document, the term "mobile device" (MD) is intended to cover those devices whose wireless communications are at least partially scheduled and controlled by the network controller. An MD may also be known as a mobile node, STA, subscriber station (SS), user equipment (UE), or any other term that may arise to describe the functionality of a mobile device. Mobile devices may move during such communications, but movement is not required.

As used within this document, the term "simultaneous" transmissions means that two or more transmissions completely overlap each other in time, while the term "concurrent" transmissions means that two or more transmissions overlap at least partially in time, but there may be portions of the transmissions that do not overlap in time (for example, when two transmissions of different length are started at the same time but end at different times). The terms "simultaneous" and "concurrent" may be similarly applied to the reception of different signals from different devices.

As used in this document, the term "frequency channel" indicates a transmission (or reception) with a particular center frequency and bandwidth, while a "spatial channel" indicates that a transmission or reception is directional in physical space. In some cases, different frequency channels may concurrently use a single spatial channel, and/or different spatial channels may concurrently use the same frequency channel.

As used in this document, a 'narrow' channel is a frequency channel having a pre-defined bandwidth in the frequency spectrum, while a 'wide' channel is a frequency channel having the combined portions of the frequency spectrum occupied by multiple ones of these narrow channels. In some embodiments, a wide channel contains only contiguous narrow channels, but in other embodiments these narrow channels don't have to be contiguous, i.e., two narrow channels that are included in the wide channel may be separated by one or more narrow channels that are not included in the wide channel. For simplicity of description, the narrow channels may frequently be described herein as having a 20 MHz bandwidth, while the wide channels may be described as having a bandwidth that is an integer multiple of the narrow channel width, but other embodiments may use narrow-channel bandwidths other than 20 MHz. Within this document the term 'channel' refers to a narrow frequency channel unless specifically described as a wide channel or a spatial channel.

As used within this document, the term "multi-user multiple input multiple output (MU MIMO) transmission" means that multiple devices may each transmit from one or more antennas at the same nominal center frequency, such that the combined transmissions produce simultaneously one or more spatial channels from each device (where the number of such spatial channels is limited by the number of transmit antennas at the transmitting device). Similarly, the term "MU MIMO reception" indicates that multiple signals with the same nominal center frequency may be simultaneously received from multiple different transmitting devices, each transmitting one or more spatial channels using one or more antennas, and each of these spatial channels may be decoded separately.

In various embodiments, a network controller transmitting to different mobile devices on a wide channel may indicate, in the transmission, which narrow channel(s) each of the mobile devices may use to respond with an acknowledgment. By transmitting their acknowledgement on different channels, all the mobile devices may transmit their acknowledgement concurrently without interfering with each other. The NC should have the capability to decode the different acknowledgements received on the different channels. In other embodiments, the network controller may assign channels and/or schedule times for those acknowledgements in various way that address specific problems with the current way of handling these acknowledgements.

FIG. 1 shows a wireless communications network, according to an embodiment of the invention. In network 100, a network controller (NC) communicates wirelessly with multiple mobile devices (MD-1 through MD-7), which may be located in different directions from the NC. Each of the devices NC and MD-1 through MD-7 may contain at least one processor, at least one memory, at least one radio and at least one antenna, wherein each radio can convert digital data into radio frequency (RF) signals for transmission and convert received RF signals into digital data. In some embodiments the NC may contain multiple radios and multiple antennas, and may communicate with each of the mobile devices concurrently on different spatial channels but the same frequency channel (either narrow or wide) by using MU MIMO techniques. In this example, the NC is communicating with seven MD's, implying that there are at least seven antennas in the NC, which may permit one spatial channel for each MD if that many are needed. However, these numbers are for example only, and other quantities of radios and antennas may be used.

Figure 2:
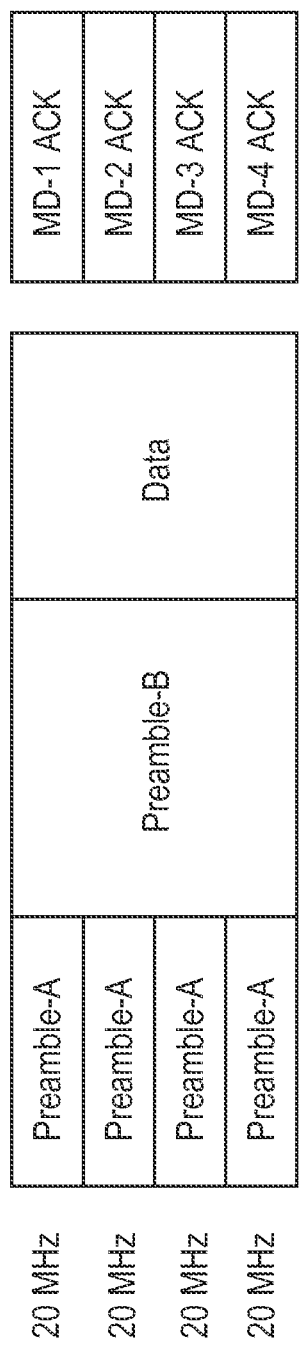
FIG. 2 shows a communications sequence between a network controller and four mobile devices, according to an embodiment of the invention.

FIG. 2 shows a communications sequence between a network controller and four mobile devices, according to an embodiment of the invention. The communication is shown taking place over four narrow channels, which are labeled as 20 MHz channels, and which may be combined for a single 80 MHz wide channel. Although four narrow channels with a 20 MHz width are shown in the example, other quantities of narrow channels and/or other channel widths may also be used.

FIG. 2 shows a Preamble-A being transmitted simultaneously over each of the four narrow 20 MHz channels by an NC, so that any of these narrow channels may be used by a receiving device to synchronize on the signal. Preamble-A may also be used to define which narrow channels make up the wide channel which follows. Following Preamble-A, Preamble-B is transmitted over the wide channel (80 MHz in this example), thereby allowing receiving devices to synchronize on the 80 MHz channel. The data portion then follows on the 80 MHz wide channel.

Each of the receiving devices (MD1-MD4) may then transmit an acknowledgement back to the NC, each on a separate narrow channel. By transmitting their acknowledgements concurrently (and maybe even simultaneously) rather than sequentially, all four narrow channels may be freed up for other use after the time it takes to transmit only one acknowledgement. Although the wide channel could be used for the acknowledgements, the acknowledgements would have to be transmitted sequentially. Further, the legacy devices in the area might not be able to decode the wide channel sufficiently to know that channel was busy, and might therefore try to transmit a signal which would interfere with the acknowledgement.

To make sure each of the mobile devices MD1-MD4 uses a different narrow channel for its acknowledgement, the NC may assign a narrow channel to each mobile device during the downlink transmission. This assignment may be placed in any feasible location in the downlink transmission. The format of the assignment may be any feasible format, such as but not limited to an information element, a table, an indexing pointer, a plain channel number, etc.

Although each MD may use a different channel to transmit its acknowledgement, a strong signal on one channel may still interfere with a weak signal on another channel. This is particularly a problem with frequency division multiple access (FDMA) communications, which typically require that 1) MD's transmit signals with very low out-of-band emissions, and 2) the NC has very tight digital filters. Both of these solutions increase hardware complexity and expense. There are several embodiments of the invention that may be used to address this problem without such complexity/expense, and these are described below.

To reduce the chance that a strong signal on one channel may interfere with a weak signal on another channel, the NC may assign channels and/or response times based on the relative signal strengths of the received signals. By monitoring the signal strength of the uplink transmissions from each MD, the NC may determine and maintain a received signal strength indicator (RSSI) for each MD, thereby providing a prediction of how strong the signal strength from each MD will probably be in a subsequent uplink communication. Since signal strength depends on many factors that may frequently change (e.g., distance between transmitter and receiver, obstructions in the signal path, orientation of the antenna, power levels at the transmitter, etc.), frequent monitoring may be needed.

This knowledge may be used to advantage by grouping MDs by their RSSI values. By scheduling only MD's with similar RSSI values (i.e., within a predefined range of each other) to transmit at the same time, the NC may reduce the chance that a strong signal on one channel will overpower a weak signal on another channel. Just how closely-matched the RSSI's should be for effective operation may depend on many factors, and a detailed discussion of those factors is beyond the scope of this document.

Figure 3:
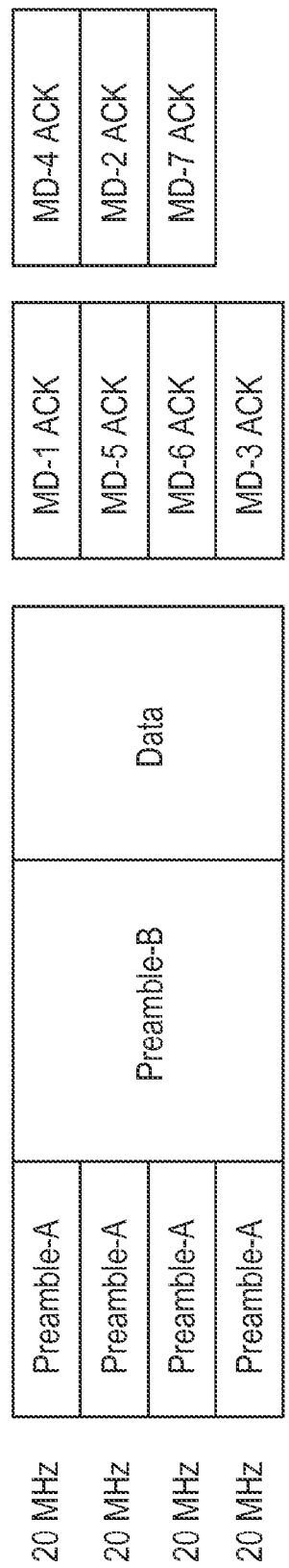
FIG. 3 shows a communications sequence between a network controller and seven mobile devices, based on RSSI groupings, according to an embodiment of the invention.

FIG. 3 shows a communications sequence between a network controller and seven mobile devices, based on RSSI groupings, according to an embodiment of the invention. In this example, the NC has previously determined that MD's 1, 3, 5, and 6 (see FIG. 1) have RSSI's that are sufficiently close in value that they may be grouped together in a concurrent response, and MD's 2, 4, and 7 also have RSSI's that are sufficiently close in value to schedule their responses together. Accordingly, MD's 1, 3, 5, and 6 are assigned to four specific channels, and they are scheduled to transmit their acknowledgements at the same time on those four channels. Similarly, MD's 2, 4, and 7 are assigned to transmit their acknowledgements concurrently on three of those same four channels, but at a later time than MD's 1, 3, 5, and 6. This technique reduces the need for power control of the MD's transmissions, although power control may still be used to further decrease the differences in RSSI.

Figure 4:
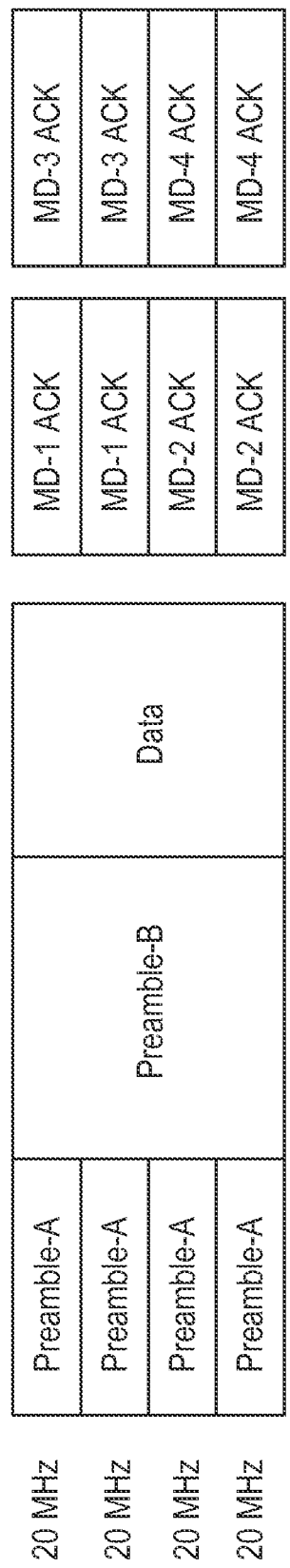
FIG. 4 shows a communications sequence in which transmissions from a device are duplicated on multiple channels, according to an embodiment of the invention.

FIG. 4 shows a communications sequence in which transmissions from a device are duplicated on multiple channels, according to an embodiment of the invention. In FIG. 4, each MD is directed to transmit its acknowledgement on two adjacent channels simultaneously. In addition to the increased likelihood of successfully decoding a message that appears on more than one channel, the NC may choose to receive only on non-adjacent channels. For example, by decoding the acknowledgement from MD-1 only on the uppermost channel and decoding the acknowledgement from MD-2 only on the lowermost channel, the NC is achieving maximum separation between the channels being used. Although MD's 3 and 4 must transmit at a later time, thus taking up more network time, this may be a reasonable tradeoff in a very noisy environment.

Figure 5:
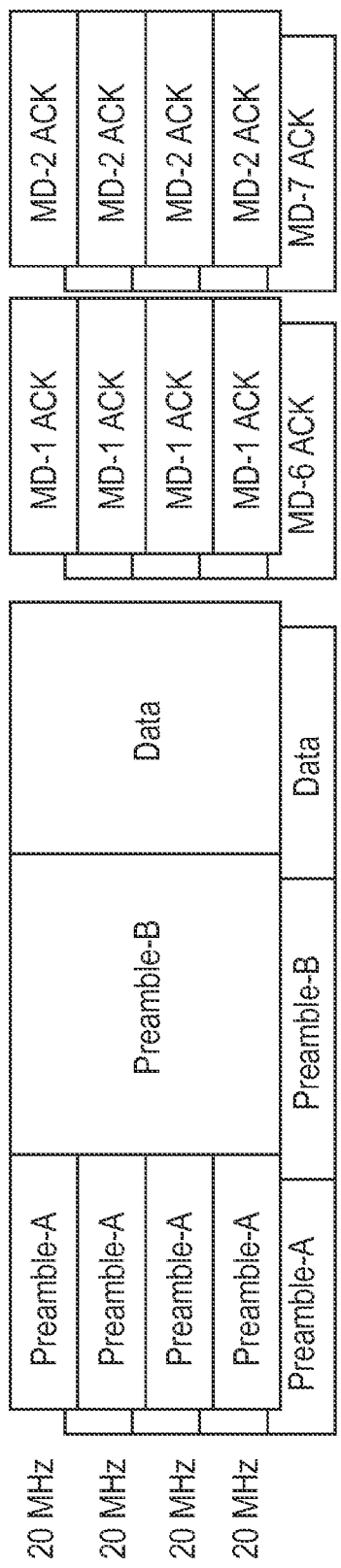
FIG. 5 shows a communications sequence using MU MIMO, according to an embodiment of the invention.

FIG. 5 shows a communications sequence using MU MIMO, according to an embodiment of the invention. In this example, there are two MU MIMO spatial channels, one of them encompassing MD's 1 and 2, the other encompassing MD's 6 and 7. Since MD's 1 and 2 are in a completely different direction from the NC than are MD's 6 and 7 (see FIG. 1), maintaining radio separation between the two spatial channels should not be difficult. Within the first spatial channel, MD-1 is scheduled to transmit its acknowledgement first on all four channels, followed by the acknowledgement from MD-2 on the same four channels. On the other spatial channel, MD-6 is scheduled to transmit its acknowledgement first on all four channels, followed by the acknowledgement from MD-7 on the same four channels. Note that the same frequency channels may be used concurrently on both spatial channels, since the spatial channels are highly directional.

Figure 6:
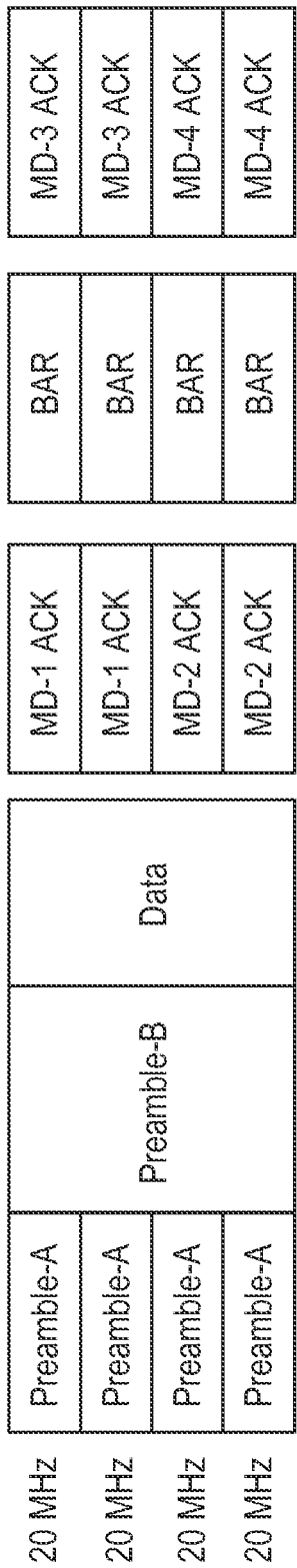
FIG. 6 shows a communications sequence using polled acknowledgements, according to an embodiment of the invention.

FIG. 6 shows a communications sequence using polled acknowledgements, according to an embodiment of the invention. In the previous examples, the timing and/or channel assignments of each of the acknowledgements was scheduled in the downlink communication which was being acknowledged. However, in some embodiments the acknowledgement may be separately scheduled. In the example of FIG. 6, the acknowledgements from MD 1 and 2 are pre-scheduled, but the acknowledgements from MD 3 and 4 are requested through a Block Acknowledgement Request (BAR) poll, which is transmitted by the NC sometime after the initial downlink transmission. The illustrated embodiment shows a separate BAR transmitted on each of the narrow 20 MHz channels that are being used, but other embodiments may differ (e.g., a single BAR transmitted over the wide 80 MHz channel).

Although various techniques have been described individually (i.e., channel assignments of FIG. 2, RSSI groupings of FIG. 3, channel duplication of FIG. 4, MU MIMO of FIG. 5, polled acknowledgements of FIG. 6), these separate techniques may be combined as needed to make use of their particular advantages.

Figure 7:
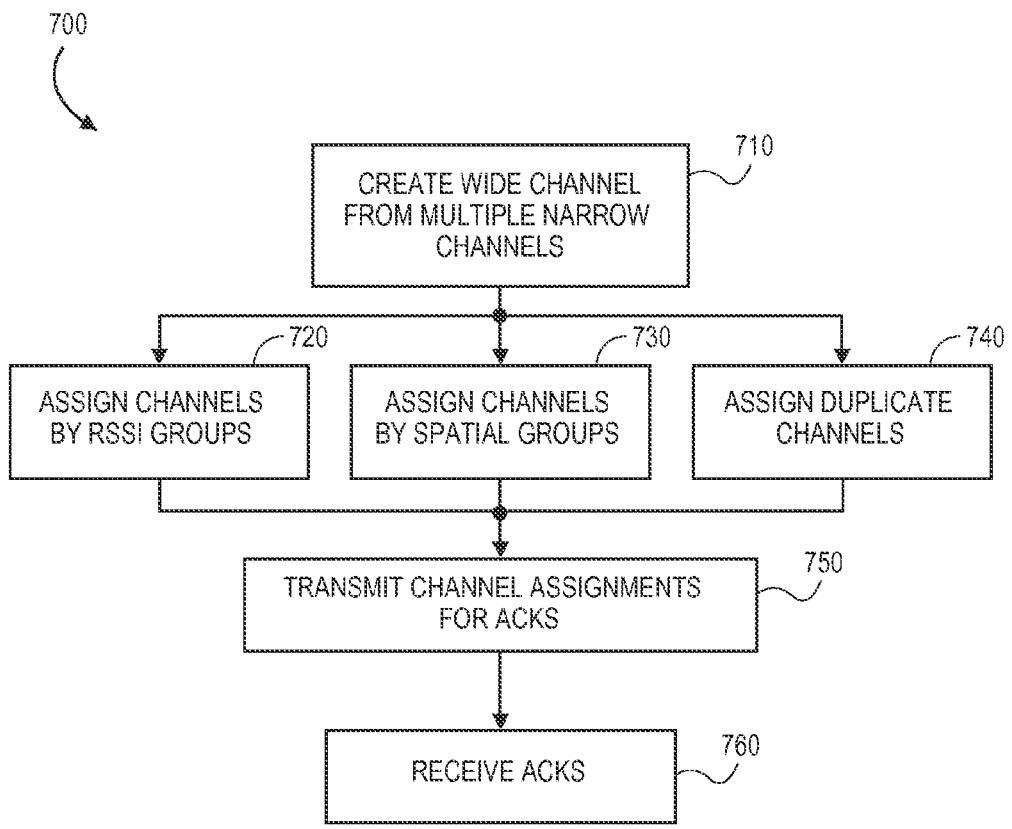
FIG. 7 shows a flow diagram of a network controller assigning channels for uplink acknowledgements, according to an embodiment of the invention.

FIG. 7 shows a flow diagram of a network controller assigning channels for uplink acknowledgements, according to an embodiment of the invention. In flow diagram 700, at 710 the network controller may define a wide channel that is composed of multiple ones of the available narrow channels. This wide channel may subsequently be used for at least part of a downlink transmission to multiple mobile devices, and the receiving mobile devices may be required to transmit uplink acknowledgements on specific narrow channels to indicate successful receipt of this downlink transmission. Each mobile device may be assigned one or more of these narrow channels to use in transmitting its acknowledgement, and this assignment may be communicated in the downlink transmission.

Three techniques for assigning the channels are shown at 720, 730, and 740. These three are shown in parallel because any one technique may be used alone or in combination with one or two of the other techniques to determine channel assignments. Organizing the mobile devices into groups based on similar RSSI values, which was previously covered in the text describing FIG. 3, is shown at 720. Assigning channels based on MU MIMO considerations, which was previously covered in the text describing FIG. 5, is shown at 730. Assigning duplicate channels for a mobile device to use, which was previously covered in the text describing FIG. 4, is shown at 740.

Regardless of which technique or combination of techniques was used to assign channels, at 750 the NC may make the mobile devices aware of these assignments by making a downlink transmission to the mobile devices that includes indications of which channels the mobile devices should use when transmitting acknowledgements. In some embodiments a mobile device may have to be polled before transmitting its acknowledgement. In other embodiments the timing of the acknowledgement may be pre-determined based on the standard being followed or other considerations. In any case, the acknowledgements may be received at 760 over the specified channel(s) and at the specified time(s).

Although the examples previously shown assume the narrow channels used for uplink acknowledgements are the same as those that make up the downlink wide channel, in some embodiments the narrow channels used for acknowledgements may be different than those that were used in the downlink. When the channels used for downlink are only a fraction of the total available channels, this flexibility may permit the NC to make more efficient use of the available channels under rapidly changing network conditions.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus, comprising:
a wireless network controller (NC) including a processor, a memory, and a radio, the radio to transmit a transmission to multiple devices over a wide channel, the wide channel comprising narrow channels to assign to the multiple devices, the transmission to contain information assigning a particular narrow channel to each one of the multiple devices, and the information is transmitted over each of the narrow channels, and
the NC to sort the devices into at least two groups based on values of received signal strength indicator (RSSI) for each device determined from signal strengths of previously-received signals from the devices and the NC to cause the devices in a single group to transmit their acknowledgements concurrently, the RSSI's for devices in the single group are to have values within a predefined range of each other.

2. The apparatus of claim 1, wherein the information assigning the particular narrow channel is to be included in a medium access control (MAC) header.

3. The apparatus of claim 1, wherein the NC is to concurrently receive, subsequent to transmitting the transmission, acknowledgements from the multiple devices.

4. The apparatus of claim 1, wherein the information is also to include timing information indicating when each of the multiple devices is to transmit its response.

5. The apparatus of claim 1, wherein the information is to indicate that at least one of the devices is to be assigned multiple narrow channels on which to simultaneously transmit a particular acknowledgement.

6. The apparatus of claim 5, wherein the network controller is to read acknowledgements from two of the devices on two narrow channels that are separated by at least one other channel.

7. A method, comprising:
transmitting, over a wide channel, a downlink transmission to multiple devices, the wide channel comprising narrow channels to assign to the multiple devices, the transmission containing information assigning a particular narrow channel to each one of the multiple device, and the information is transmitted over each of the narrow channels;
sorting the devices into at least two groups, with the devices in a group having their received signal strength indicators (RSSI) within a predefined range of each other and the RSSIs are determined by signal strengths of previously-received signals from the devices; and
transmitting further information to the devices in a single group to cause the devices in the single group to transmit their acknowledgements concurrently.

8. The method of claim 7, wherein the information assigning the particular narrow channel is included in a medium access control (MAC) header.

9. The method of claim 7, comprising receiving acknowledgements from the multiple devices concurrently, subsequent to said transmitting.

10. The method of claim 7, wherein the information includes timing information indicating when each of the multiple devices is to transmit its response.

11. The method of claim 7, comprising assigning multiple particular narrow channels to a particular device to indicate the particular device is to transmit a particular acknowledgement concurrently on all of the multiple particular narrow channels.

12. The method of claim 11, wherein the network controller is to read acknowledgements from two of the devices on two narrow channels that are separated by at least one other narrow channel.

13. An article comprising a non-transitory computer-readable medium that contains instructions, which when executed by one or more processors result in performing operations comprising:
transmitting, over a wide channel, a downlink transmission to multiple devices, the wide channel comprising narrow channels to assign to the multiple devices, the transmission containing information assigning a particular narrow channel to each one of the multiple devices, and the information is transmitted over each of the narrow channels;
sorting the devices into at least two groups, with the devices in a group having their received signal strength indicators (RSSI) within a predefined range of each other and the RSSIs are determined by signal strengths of previously-received signals from the devices; and
transmitting further information to the devices in a single group indicating the devices in the single group are to transmit their acknowledgements concurrently.

14. The article of claim 13, wherein the information the particular narrow channel is included in a medium access control (MAC) header.

15. The article of claim 13, wherein the operations further comprise receiving acknowledgements from the multiple devices concurrently, subsequent to said transmitting.

16. The article of claim 13, wherein the information includes timing information indicating when each of the multiple devices is to transmit its response.

17. The article of claim 13, wherein the operations further comprise assigning multiple particular narrow channels to a particular device to indicate the particular device is to transmit a particular acknowledgement concurrently on all of the multiple particular narrow channels.

18. The article of claim 17, wherein the operations further comprise reading acknowledgements from two of the devices on narrow channels separated by at least one other narrow channel.

* * * * *

UNITED STATES PATENT AND TRADEMARK OFFICE
CERTIFICATE OF CORRECTION

| | | |
|---|---|---|
| PATENT NO. | : 8,774,088 B2 | |
| APPLICATION NO. | : 12/752715 | |
| DATED | : July 8, 2014 | |
| INVENTOR(S) | : Michelle X Gong et al. | |

It is certified that error appears in the above-identified patent and that said Letters Patent is hereby corrected as shown below:

IN THE CLAIMS

In column 8, line 35-36, in claim 14, delete "information the particular" and insert -- information assigning the particular --, therefor.

Signed and Sealed this
Fifth Day of May, 2015

Michelle K. Lee
*Director of the United States Patent and Trademark Office*